(No Model.)
W. LEWIS.
PLANTER.
No. 350,686. Patented Oct. 12, 1886.
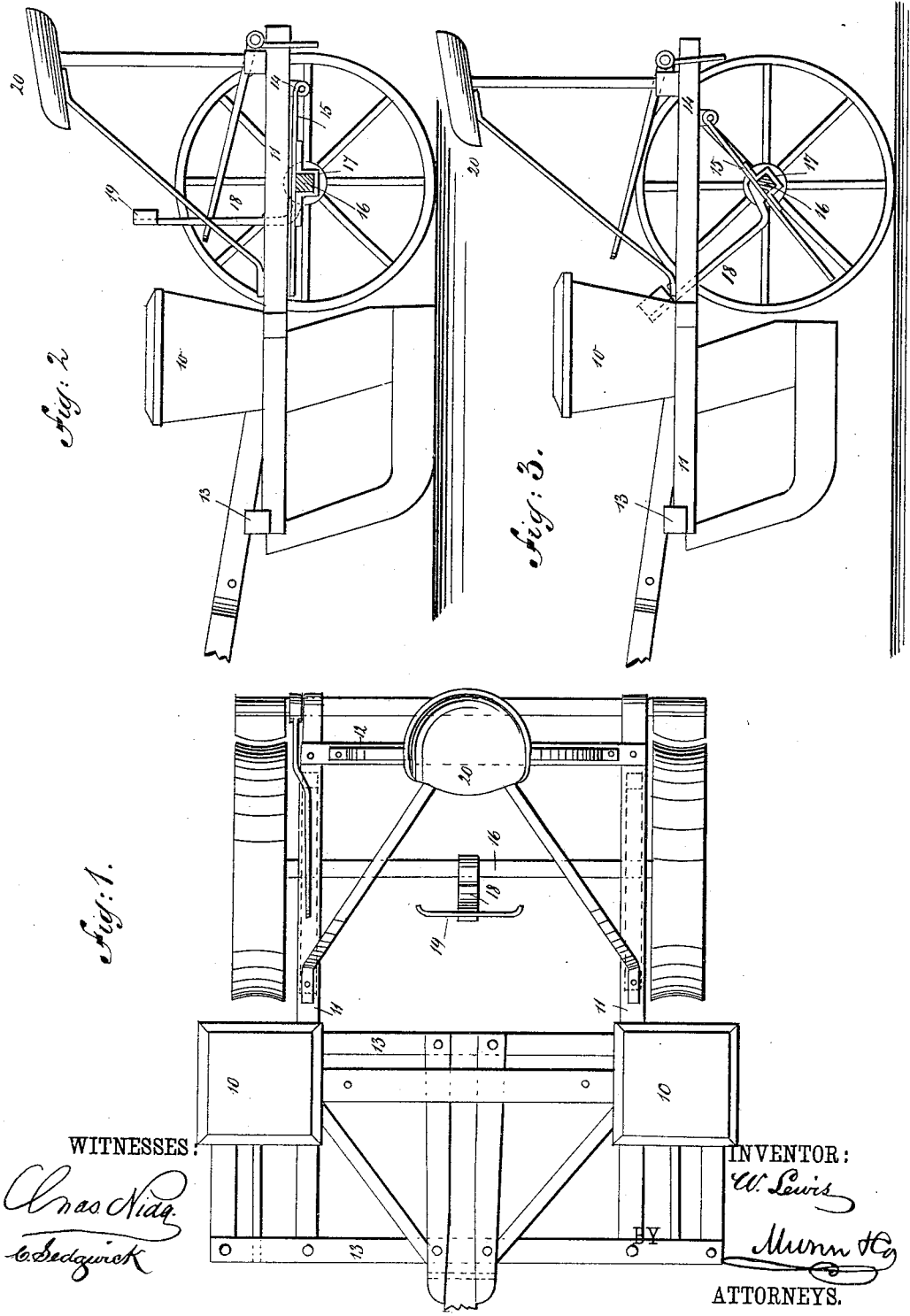
WITNESSES:
Chas Nida
C. Sedgwick
INVENTOR:
W. Lewis
BY Munn & Co
ATTORNEYS.

UNITED STATES PATENT OFFICE.

WILLIAM LEWIS, OF DAWN, MISSOURI.

PLANTER.

SPECIFICATION forming part of Letters Patent No. 350,686, dated October 12, 1886.

Application filed August 28, 1886. Serial No. 212,0-5. (No model.)

*To all whom it may concern:*

Be it known that I, WILLIAM LEWIS, of Dawn, in the county of Livingston and State of Missouri, have invented a new and Improved Planter, of which the following is a full, clear, and exact description.

The object of my present invention is to so arrange and construct the various parts of a planter that the main frame of the machine, and with it the parts carried thereby, may be raised above its normal position when it is desired to transport the planter from place to place or to turn the machine at the end of a row; and this object I accomplish by hinging the main frame to arms that are rigidly connected to and extend to the rear from the axle of the planter, said axle being provided with a rigidly-connected foot-lever, which may be depressed to partially rotate the axle and elevate the main frame of the machine, as will be hereinafter more particularly explained.

Reference is to be had to the accompanying drawings, forming a part of this specification, in which similar figures of reference indicate corresponding parts in all the views.

Figure 1 is a plan view of my improved form of planter. Fig. 2 is a side view of the same, representing the parts in the position they assume when ready for use in the planting of corn, one of the wheels being removed and the axle being shown in section; and Fig. 3 is a similar view, except that the parts are represented as being in their elevated position.

In the construction illustrated in the drawings, the hoppers 10, the slides of which are operated in any manner desired, are carried by a main frame consisting of longitudinal timbers, 11, a rear cross-strip, 12, and forward cross-strips, 13. To the under side of the longitudinal timbers 11 at 14 there are hinged strips 15, which said strips are rigidly connected to the axle 16 by clips 17, the axle being in advance of the hinges 14. To about the center of the axle 16 there is rigidly secured an upwardly-extending lever, 18, formed with the foot-piece 19, which is within the reach of the driver when seated in the seat 20.

From the construction described it will be seen that the normal position of the parts will be as illustrated in Fig. 2, but that if the lever 18 be depressed the axle 16 will be partially turned and the rear ends of the strips 15 will be elevated, as indicated in Fig. 3, and as the rear ends of the strips 15 are hinged to the timbers 11 of the main frame of the planter said main frame will be carried upward, and will be so held as long as the lever 18 is held depressed, this movement of the parts being brought about when it is desired to move the planter from place to place or to turn it about at the end of a row.

Having thus fully described my invention, I claim as new and desire to secure by Letters Patent—

1. The combination, with the main frame of a planter, of strips 15, rigidly connected to the axle and hinged to the frame at points behind the axle, and a lever, 18, also rigidly connected to the axle, substantially as described.

2. The combination, with the axle 16, of clips 17, arms 15, hinged to the longitudinal timbers of the main frame of the planter at 14, and a lever, 18, rigidly connected to the axle, substantially as described.

WILLIAM LEWIS.

Witnesses:
J. J. JAMES,
WM. STAGNER.